US011592362B2

(12) United States Patent
Biesinger et al.

(10) Patent No.: US 11,592,362 B2
(45) Date of Patent: Feb. 28, 2023

(54) SYSTEM AND METHOD FOR FULL-SCALE SAMPLING TO CONDUCT MATERIAL TESTS ON A STEAM TURBINE ROTOR

(71) Applicant: GENERAL ELECTRIC COMPANY, Schenectady, NY (US)

(72) Inventors: Frank Biesinger, Karlsruhe (DE); Andreas Hartmann, Schinznach (CH)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 240 days.

(21) Appl. No.: 17/030,648

(22) Filed: Sep. 24, 2020

(65) Prior Publication Data
US 2022/0090991 A1    Mar. 24, 2022

(51) Int. Cl.
*G01N 1/08* (2006.01)
*F01D 5/14* (2006.01)
(Continued)

(52) U.S. Cl.
CPC .............. *G01N 1/08* (2013.01); *F01D 5/147* (2013.01); *F01D 21/003* (2013.01); *F01K 7/16* (2013.01);
(Continued)

(58) Field of Classification Search
CPC ........ G01N 1/08; G01N 25/72; F01D 21/003; F05D 2260/83
See application file for complete search history.

(56) References Cited

U.S. PATENT DOCUMENTS

| 4,537,538 A | * | 8/1985 | Mitamura | ............. | B23D 37/14 |
| | | | | | 409/282 |
| 5,311,734 A | * | 5/1994 | Pope | ......................... | F01D 5/08 |
| | | | | | 415/173.7 |

(Continued)

FOREIGN PATENT DOCUMENTS

| CN | 102 310 309 | 1/2012 | | |
| JP | 4 594948 | 12/2010 | | |
| WO | WO-2019011535 A1 | * | 1/2019 | .............. B23C 3/00 |

OTHER PUBLICATIONS

Stifanese Roberto et al., "Corrosion investigation of a steam turbine after power generator failure onboard a vessel; A case study", Engineering Failure Analysis, Pergamon, GB, vol. 64, Mar. 10, 2016, pp. 58-66.

(Continued)

*Primary Examiner* — Eric S. McCall
(74) *Attorney, Agent, or Firm* — Grogan, Tuccillo & Vanderleeden, LLP (57) ABSTRACT

A method for generating material test samples for conducting material tests of a legacy steam turbine rotor having an inter-blade region rotor surface, and an inlet region rotor surface adjoining the inter-blade region rotor surface. The method includes forming an annular ring of rotor material in the sample area and forming a material test sample from a portion of the annular ring. Also described is a legacy steam turbine rotor including an inter-blade region rotor surface, and an inlet region rotor surface adjoining the inter-blade region rotor surface. The steam turbine rotor having a groove formed therein, and wherein the groove is machined to enable removal of material from the steam turbine rotor to form samples configured to enable at least one of conducting material property tests and operating the improved legacy steam turbine rotor at an expanded thermal stress compared to the legacy steam turbine rotor.

19 Claims, 4 Drawing Sheets

(51) Int. Cl.
*F01K 7/16* (2006.01)
*G01N 25/72* (2006.01)
*F01D 21/00* (2006.01)

(52) U.S. Cl.
CPC ......... *G01N 25/72* (2013.01); *F05D 2260/83* (2013.01)

(56) References Cited

U.S. PATENT DOCUMENTS

| | | | |
|---|---|---|---|
| 2011/0103970 A1 | 5/2011 | Bekyigit et al. | |
| 2011/0252885 A1* | 10/2011 | Allen, IV | G01M 1/24 73/487 |
| 2012/0152007 A1* | 6/2012 | Holmes | G06F 30/23 73/112.01 |
| 2018/0283208 A1* | 10/2018 | Vogt | B08B 1/04 |
| 2020/0386111 A1* | 12/2020 | Reynolds | F01D 9/04 |
| 2022/0090991 A1* | 3/2022 | Biesinger | F01D 5/147 |

OTHER PUBLICATIONS

International Search Report issued in corresponding PCT Application No. PCT/US2021/071547 dated Dec. 23, 2021.

* cited by examiner

SYSTEM AND METHOD FOR FULL-SCALE SAMPLING TO CONDUCT MATERIAL TESTS ON A STEAM TURBINE ROTOR

TECHNICAL FIELD

The present disclosure relates generally to rotors for steam turbines and, more specifically, to modifications to legacy rotor configurations that enable full-scale sampling to conduct material tests to assess thermal aging and fatigue of such rotors.

BACKGROUND

A steam turbine may include a rotor with a thrust balance piston having a relief groove for relieving thermal stress that is outside the region of the live steam flow path. This relief groove is displaced axially opposite the direction of the operating steam flow through the blade flow path.

With the increased use of renewable power, there is an increased need for the electrical network to operate with increased power plant and steam turbine cycling. The operational flexibility requirements may be limited by the steam turbine life since increased exposure to frequent thermal transients increases the risk of the occurrence of thermal fatigue crack initiation during cold, warm and hot start-ups, as well as during load transitions and shutdowns. Additionally, in steam turbines having multiple stages or turbines, for example, a high-pressure turbine and an intermediate pressure turbine, different thermal conditions in each of the steam turbines/sections results in different low cycle fatigue life of rotor portions of each of the steam turbines/sections. As a result, maintenance schedule requirements can be unsynchronised, which may result in an increase in maintenance outages. Although it may be possible to balance the low cycle fatigue life of rotor portions by the selection of rotor materials to improve toughness and ductility, there are practical limitations on achieving the objectives with rotor material selection alone. These measures do not overcome the potential negative effects that thermal transients have on low cycle fatigue life of the rotor.

As a result, the lifetime status of a steam turbine needs to be supervised. Generally, theoretical assessments are conducted with real, but generalized operating data, based on minimum material properties. To that end, investigations of the actual mechanical behavior of the rotor in the hot section would be beneficial. In some instances, a small-scale test sampling method is used to perform Fracture Appearance Transition Temperature (FATT) assessments. Unfortunately, such methods often exhibit large inaccuracies resultant from the small sample size. Moreover, for reaction drum type rotors, no database of FATT data of aged in-service steam turbine rotors is generally available. This is namely the result of a lack of material for easy removal from which test samples could be obtained. Conversely, for impulse rotor steam turbines, as the rotor of the steam turbine includes discs with no pressure drop across the respective stages, it is permissible to drill holes into the discs (as long as they are balanced) and retrieve sample material for further investigation as needed.

There is, therefore, a need to improve sampling of the rotor to assess the effect of thermal aging onto creep rupture properties. Additionally, there is a need to improve low cycle fatigue life of steam turbine rotor portions and to tailor the low cycle fatigue life of different portions of the steam turbine rotor to synchronise rotor portion maintenance cycles.

SUMMARY

A method for generating a material test sample for conducting one or more material tests of a legacy steam turbine rotor having an inter-blade region rotor surface and an inlet region rotor surface adjoining the inter-blade region rotor surface. The method includes removing an annular ring of rotor material in a sample area selected from the inter-blade region rotor surface and the inlet region rotor surface, the removing of the annular ring creating an improved legacy steam turbine rotor and forming a material test sample from a portion of the annular ring.

A system for retrieving a material test sample for conducting one or more material tests retrieved from a legacy steam turbine rotor, the legacy steam turbine rotor having an inter-blade region rotor surface and an inlet region rotor surface adjoining the inter-blade region rotor surface. The system includes a segmented section of an annular ring of rotor material from the legacy steam turbine rotor, the annular ring machined from a groove formed in the legacy steam turbine rotor, wherein the groove is machined to enable removal of the annular ring and enable forming of the material test sample.

An improved steam turbine rotor. The improved steam rotor including a legacy steam turbine rotor having an inter-blade region rotor surface and an inlet region rotor surface adjoining the inter-blade region rotor surface and a groove formed in either the inlet region rotor surface or the inter-blade region rotor surface of the legacy steam turbine rotor. The groove is machined to enable removal of material from the legacy steam turbine rotor to enable at least one of conducting material property tests and operating the improved steam turbine rotor at an expanded thermal stress compared to the legacy steam turbine rotor based at least in part on the material property tests.

Additional features and advantages are realized through the techniques of the present disclosure. Other embodiments and aspects of the disclosure are described in detail herein. For a better understanding of the disclosure with its advantages and its features, refer to the description and to the drawings.

BRIEF DESCRIPTION OF THE DRAWINGS

The described embodiments will be better understood from reading the following description of non-limiting embodiments, with reference to the attached drawings, in which.

DETAILED DESCRIPTION

Exemplary embodiments of the present disclosure are now described with reference to the drawings, wherein like reference numerals are used to refer to like elements throughout. In the following description, for purposes of explanation, numerous specific details are set forth to provide a thorough understanding of the disclosure. However, the present disclosure may be practiced without these specific details and is not limited to the exemplary embodiment disclosed herein.

While the various embodiments as described herein are suitable for use with and in the application of steam generation systems that employ a steam turbine, a reaction drum steam turbine has been selected and described solely for clarity of illustration. Other types of steam turbine construction, such as steam turbines with one or more sections, drum-type turbines, and impulse turbines, are equally applicable.

Figure 1:
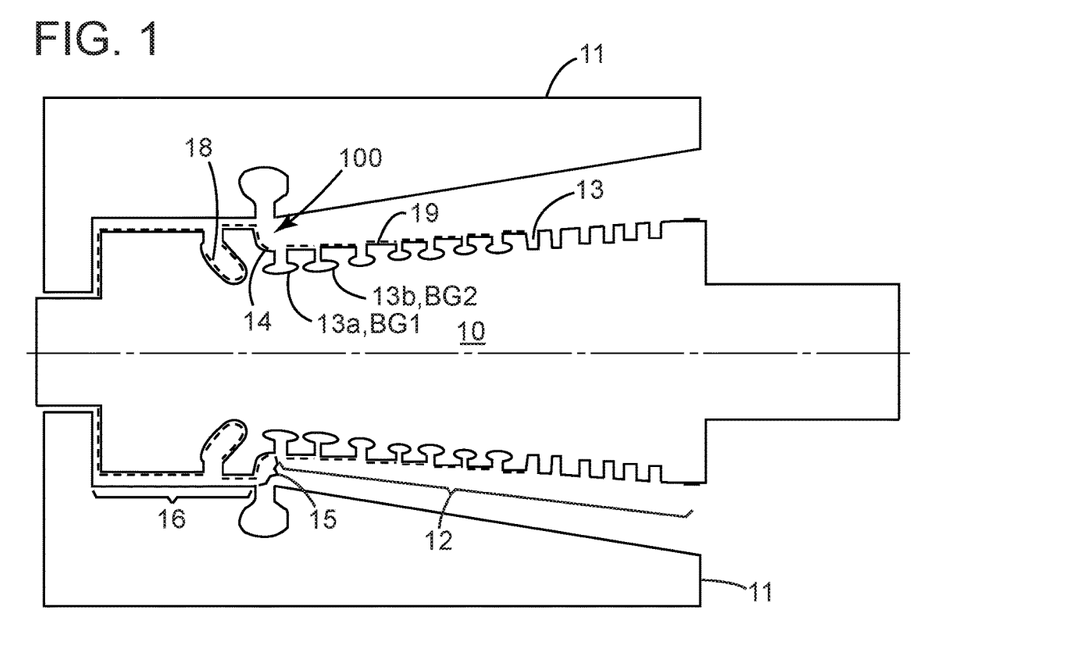
FIG. 1 is a sectional view of a high-pressure steam turbine rotor including a high-pressure steam turbine inner casing, according to an embodiment of the disclosure.
Figure 4A:
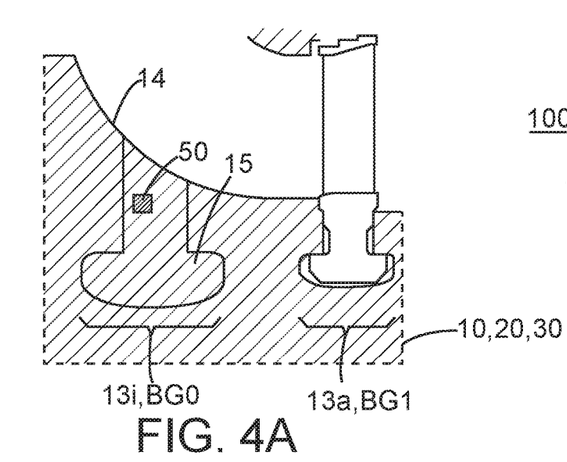
FIG. 4A is a cross-sectional view of a portion of a steam turbine rotor depicting the location of a blade groove BG0 used for the acquisition of samples from the steam turbine rotor, according to an embodiment.

FIG. 1 illustrates an example of a high-pressure steam turbine rotor 10, which is typically contained in an inner casing 11. The high-pressure steam turbine rotor 10 includes an inter-blade region rotor surface 12, an inlet region rotor surface 14, and a piston region rotor surface 16. The inter-blade region rotor surface 12 is a region in which axially spaced rows of rotating blades (one of which is shown in FIG. 4A) extend circumferentially around the high-pressure steam turbine rotor 10. These blades are attached to the high-pressure steam turbine rotor 10 by means of blade grooves 13. The first row of blade grooves are commonly labeled BG1 and denoted as 13a, the second row of blade grooves labeled BG2 and denoted 13b, and so on through the inter-blade region rotor surface 12 depending on the number of blade stages a given section of the steam turbine employs. The inter-blade region rotor surface 12 can therefore be defined as the surface region of the high-pressure steam turbine rotor 10 in which blade grooves 13 are located.

The inlet region rotor surface 14 is upstream of and immediately adjacent the inter-blade region rotor surface 12. In operation, this portion of the rotor is exposed to steam as it is fed into the steam turbine. Typically, the inlet region rotor surface 14 is shaped to direct radially fed steam into an axial direction by having a radial-to-axial transition surface that extends to the first upstream blade groove 13a, though other shapes are possible. In an embodiment, the inlet region rotor surface 14 and/or other areas in the inter-blade region 12 are employed to provide a sample area 15 for removing material as needed for providing material for material testing as described herein. For example, while some embodiments of the present disclosure describe the inlet region rotor surface 14 as being employed for acquiring samples, other embodiments are directed to steam turbine rotors 10 whose inter-blade region rotor surface 12 includes areas without blade grooves 13 and whose inter-blade region rotor surface 12 may be utilized for acquiring samples.

The piston region rotor surface 16 is located immediately adjacent the inlet region rotor surface 14, such that the inlet region rotor surface 14 is located axially between the piston region rotor surface 16 and the inter-blade region rotor surface 12. The purpose of the piston region is to counteract end thrust of blading typical of reaction type steam turbines and to produce a thrust of the rotor towards the high-pressure end of the turbine under all operating conditions. Pistons may be either integral with the solid rotor or may be shrunk and keyed into position. The piston region rotor surface 16 may include a stress relief groove rotor surface 18 upstream of and in close proximity to the inlet region rotor surface 14.

In one or more embodiments, each of the inter-blade region rotor surface 12, the inlet region rotor surface 14, the piston region rotor surface 16 and/or the stress relief groove rotor surface 18 have a bonded thermal barrier coating 19. The thermal barrier coating 19 may either partially or fully cover surfaces 12, 14, and 16 (including surface 18), and the radial thickness of the thermal barrier coating 19 may be either uniform or may vary.

Figure 2A:
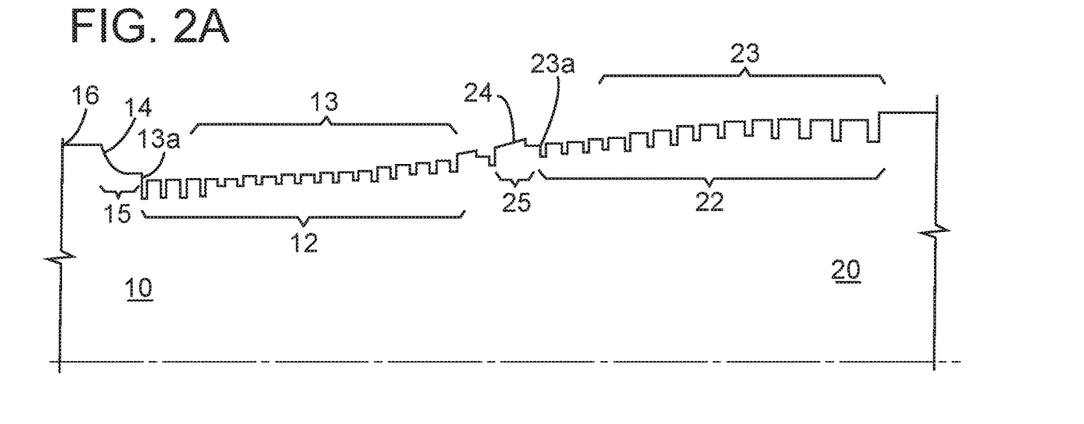
FIG. 2A is a partial sectional view of a high-pressure steam turbine rotor and an intermediate pressure steam turbine rotor, according to an embodiment of the disclosure.

An exemplary embodiment of a combined high-pressure steam turbine rotor 10 and intermediate pressure steam turbine rotor 20 is shown in FIG. 2A. FIG. 2A also depicts an inter-blade region rotor surface 22 and an inlet region rotor surface 24. The inter-blade region rotor surface 22 is axially between rotating blades (not shown) that are circumferentially distributed on the intermediate pressure steam turbine rotor 20 by means of blade grooves 23 that extend through the rotor surface.

The inlet region rotor surface 24 is upstream of and immediately adjacent the inter-blade region rotor surface 22. This region of the rotor 20 is exposed to steam as it is fed into the steam turbine. Typically, the region is shaped to direct radially fed steam into an axial direction by having a radial-to-axial transition surface that extends to the first upstream blade groove 23a. In some embodiments, the steam feed to the intermediate pressure steam turbine rotor 20 may not be reheated and may be directed from the high-pressure section. Once again, in an embodiment, the inlet region rotor surface 24 and/or other areas in the inter-blade region 22 are employed to provide a sample area 25 for removing material as needed for providing material for material testing, as described herein.

A piston region rotor surface (not shown) may be located immediately adjacent the inlet region rotor surface 24, such that the inlet region rotor surface 24 is located between the piston region rotor surface and the inter-blade region rotor surface 22 as described previously for the high-pressure section. In exemplary embodiments, each of the inter-blade region rotor surface 22, the inlet region rotor surface 24, and the piston region rotor surface have a thermal barrier coating bonded to the respective surface.

Figure 2B:
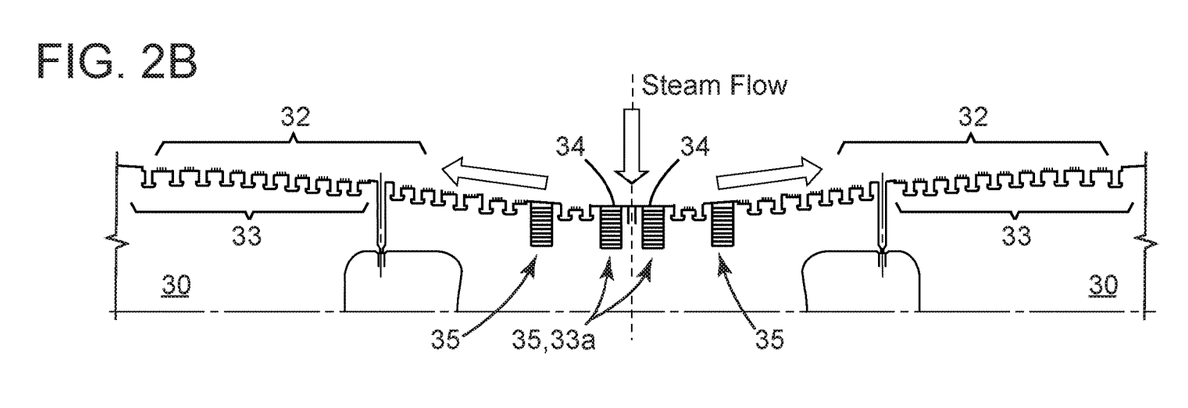
FIG. 2B is a partial sectional view of a dual flow steam turbine rotor, according to an embodiment of the disclosure.

An exemplary embodiment of a dual flow steam turbine rotor 30 is shown in FIG. 2B. The rotor 30 includes dual inter-blade region rotor surfaces 32 and inlet region rotor surfaces 34. The inter-blade region rotor surfaces 32 are disposed axially between rotating blades (not shown) that are circumferentially distributed on the dual flow steam turbine rotor 30 by means of blade grooves 33 that extend into the surface of the rotor 30.

The inlet region rotor surfaces 34 are upstream of and immediately adjacent the inter-blade region rotor surfaces 32. This region of the rotor 30 is exposed to steam as it is fed into the steam turbine. Typically, the region is shaped to direct radially fed steam into an axial direction by having a radial-to-axial transition surface that extends to the first upstream blade groove 33a. In some embodiments, the inter-blade region rotor surfaces 32 are employed to provide a sample area 35 for removing material as needed for providing material for testing as described herein. Uniquely in this Figure, the inter-blade region rotor surfaces 32 include second, or alternate, sampling locations 35 between what would be denoted as BG2 and BG3 that may also be employed for removing material to provide for material tests.

Metal materials, such as stainless steel, titanium alloys, nickel-base alloys and the like are widely utilized for steam turbine rotors in the petrochemical, thermoelectric, fossil and nuclear power, automobile, and aviation industries. For example, low alloy CrMoV steels (that is, steels containing chromium, molybdenum, and vanadium) are often used at temperatures up to 565° C. For super-critical applications, steel alloys having 9% Cr are used. For power plant applications operating at even higher temperatures (e.g., in the area of 700° C.), nickel-based alloys may be used for the rotor. These materials are manufactured to operate for long durations under the rigors of high temperature, high pressure, vibration, and dynamic forces. As such, these components will inevitably be subject to high temperature, creep, and fatigue damage, which will cause material property degradation, and which ultimately may result in material failure. Therefore, periodic testing and assessment to evaluate the degradation are conducted, particularly on critical or expensive components. However, health monitoring and assessment can be difficult and labor intensive, especially for large steam turbines, and can result in costly plant shutdowns and delays. Thus, a method to expedite accurate testing is highly advantageous.

Traditional Charpy tests are standardized, high strain-rate tests that determine the amount of energy absorbed by a material during fracture. Absorbed energy is a measure of the material's notch toughness. It is widely used in industry as an indicator of material integrity, since it is easy to prepare and conduct and results can be obtained quickly and comparatively inexpensively. Disadvantages of Charpy tests are that some results are only comparative, traditional fracture tests require a sizable sample on the equipment, and, after the sampling, a repair by welding is typically required at the sampling point. Moreover, body-centered-cubic or ferritic alloys exhibit significant differences in behavior when the alloys are impact-tested over a range of temperatures. At temperatures above a transition temperature, impact test specimens tend to fracture by a ductile mechanism (usually microvoid coalescence), thereby absorbing relatively large amounts of energy. At lower temperatures, the same impact test specimens tend to fracture in a brittle (usually cleavage) manner, absorbing appreciably less energy. Within the transition temperature range, the test specimens will generally exhibit areas having a mixture of ductile fracture and brittle fracture.

The temperature range of the transition from one type of behavior to the other varies according to the material being tested. This transition behavior may be defined in various ways for specification purposes, for example, a minimum test result for absorbed energy, fracture appearance, lateral expansion, or a combination thereof, at a specified test temperature. In some circumstances, the transition temperature is the temperature at which either the absorbed energy or fracture appearance attains a specified level when testing is performed over a range of temperatures. Alternatively, it may be desirable to determine the fracture appearance transition temperature (FATT) of the specimen, where FATT is the temperature at which the required minimum percentage of shear fracture (n) is obtained. FATT is a quantitative target of thermal aging, material fatigue, and anti-cracking ability, i.e., an assessment of the integrity of the structure. It provides an important evaluation of the material structure of the lifetime of a component. The FATT enables evaluation of the rotor to establish a level of fatigue or, said another way, the expected life expectancy for the component. Therefore, actual sampling of the component facilitates evaluation of fatigue and life expectancy, particularly with respect to expected results for a given operation profile for the steam turbine rotor 10.

Figure 3:
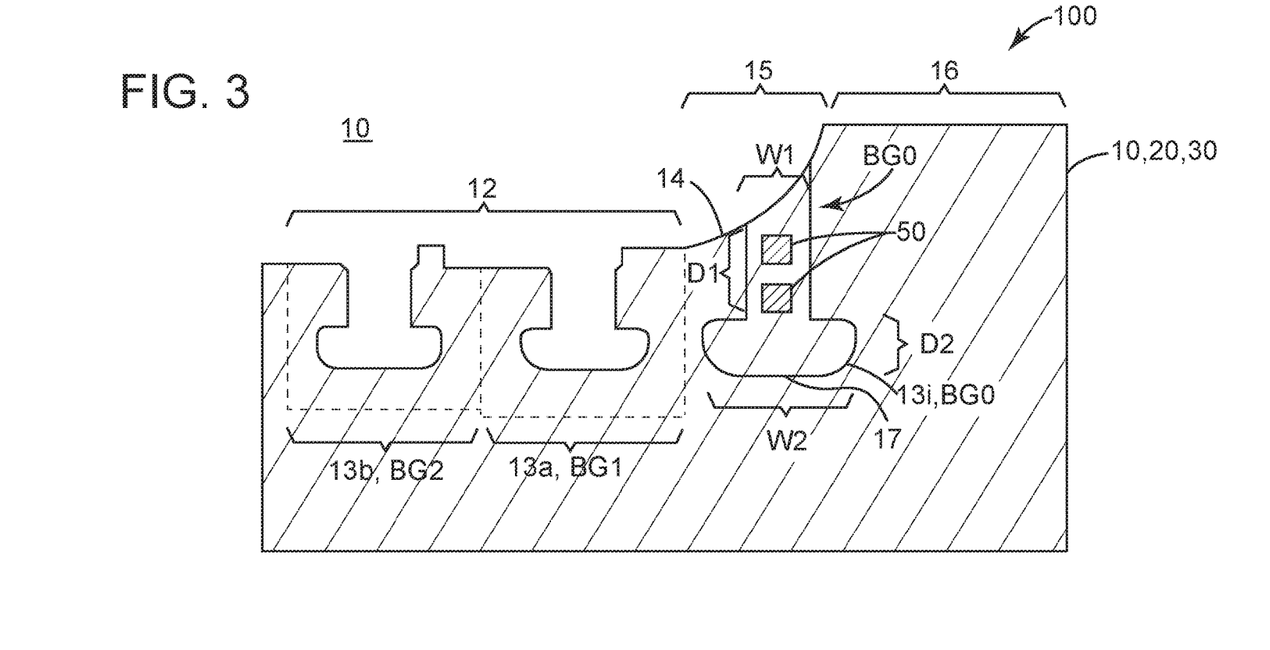
FIG. 3 is an expanded cross-sectional view of a portion of a steam turbine rotor depicting the formation of a blade groove BG0 forward of blade groove BG1 and the acquisition of samples via blade groove BG0, according to an embodiment.

Turning now to FIG. 3, a portion 100 of the steam turbine rotor 10, 20, 30 depicts a portion of the inter-blade region rotor surface 12 (or 22, 32) and inlet region rotor surface 14. While a steam turbine rotor 10 is depicted, the depicted portions are equally applicable to the intermediate pressure rotor 20 or dual flow rotor 30, as described above. From here on, for simplification, components for each of the high-pressure rotor 10, intermediate-pressure rotor 20, and dual-flow rotor 30 will be referred to collectively with the description henceforth applying to each type of rotor. In an embodiment, a portion of the blade grooves 13 are depicted extending through a portion of the inter-blade region rotor surface 12 proximal to the inlet region rotor surface 14. As described herein, the inlet region rotor surface 14 is shaped to direct radially fed steam into an axial direction by having a radial-to-axial transition surface that extends to the first upstream blade groove 13a.

However, in an embodiment, the inlet region rotor surface 14 and/or other areas in the inter-blade region 12 are utilized to provide a sample area 15 for removing material for testing and FATT determination. For example, material tests may include one or more of Charpy tests, tensile tests, hardness tests, creep tests, low cycle fatigue tests, microstructure testing, and the like.

In an embodiment, an additional initial blade groove 13i (also denoted BG0) is introduced. The initial blade groove BG0, 13i is of substantially similar size and shape as the other blade grooves 13 (e.g., 13a, 13b, etc.) but need not necessarily be. For example, the initial blade groove 13i may be cut to a first depth D1 in the rotor surface at a selected width W1 and subsequently may be cut to a further depth denoted D2 at a larger selected width denoted W2 to form an expanded portion 17 distal from the inlet region rotor surface 14. The particular profile for the expanded portion 17 is selected, advantageously, to provide thermal and dynamic stress relief in the rotor 10, 20, and/or 30. For example, it may be desirable to cut the expanded portion 17 of the initial blade groove BG0, 13i to have rounded corners and edges at its width W2.

In some embodiments, the expanded portion 17 may have rounded corners that exhibit different geometries and/or curvature from each other, such geometries including, but not limited to, circular, elliptical, parabolic, or polynomial functions, and the like. In an embodiment, the initial blade groove, BG0, 13*i* exhibits an expanded portion 17 having a cross-section that is symmetrical in at least one of an axial direction and a radial direction. In another embodiment, the initial blade groove BG0, 13*i* exhibits an expanded portion 17 that is asymmetrical in at least one of an axial or a radial direction. In an embodiment, the initial blade groove, BG0, 13*i* exhibits a cross-section of the expanded portion 17 that is substantially rounded, elliptical, or oval shaped. In another embodiment, the initial blade groove, BG0, 13*i* exhibits substantially the same cross-sectional shape as the other blade grooves 13, in particular, the first blade groove 13*a* (also denoted as BG1). In yet another embodiment, the initial blade groove BG0 may be larger and deeper than the first blade groove BG1, 13*a*. In other embodiments, the initial blade groove BG0 may be smaller and shallower than the first blade groove BG1, 13*a*.

Initial (BG0) blade grooves are currently implemented into new build steam turbine rotors. In modern applications, an unused blade groove (that is, a blade groove in which no blades are installed) is generally used to reduce the fatigue and thermal stresses at the hot section of newly implemented rotors. However, initial blade grooves e.g., BG0,13*i* are not implemented on legacy rotors 10, 20, 30. Legacy rotors 10, 20, 30 are also subject to fatigue and damage as a result of their time in service. Legacy rotors are particularly in need of fatigue evaluations and assessments to gauge their suitability for continued service. The described embodiments take advantage of this feature first to provide for sampling, while at the same time implementing a potential enhancement in thermal stress relief for the rotor. As a result, based on the benefits of taking samples for conducting the testing described here, a reduction of stress/stress relief is implemented in an improved new blade groove geometry for the rotor 10, 20, 30. Improved stress relief may allow for faster start up and increased cycling by mitigating thermal stresses in the modified legacy rotors 10, 20, 30.

Advantageously, the removal of the material to form the groove BG0, 13*i* is machined in a manner to facilitate retrieval of test samples 50 of sufficient size to conduct testing for evaluation of FATT. The particular machining and/or cutting scheme employed is not critical, provided the material is removed in a manner consistent with conducting the testing. In an embodiment, samples on the order employed for standard Charpy tests, which are generally rectangular and have a width of 10 millimeters (mm), a height of 10 mm, and a length of 10 mm or 20 mm or 50 mm, may readily be achieved by machining the rotor on a lathe, for example, as described herein and as depicted in FIGS. 4A-4F.

FIGS. 4A-4F depict exemplary cross-sections of the rotor 10 and an exemplary process for machining and forming the initial blade slot BG0, 13*i* in a rotor 10, as well as acquiring and fabricating samples 50 for conducting fatigue and Charpy testing. FIG. 5 is a flow chart depicting an example process 200 for acquiring test samples from a legacy steam turbine rotor 10 in accordance with an embodiment. In an embodiment, as depicted at FIG. 4A, a profile of a desired initial blade slot BG0,13*i* is depicted with a section designated for a sample 50 to be machined from the inlet region surface 14 of the rotor 10.

Figure 4B:
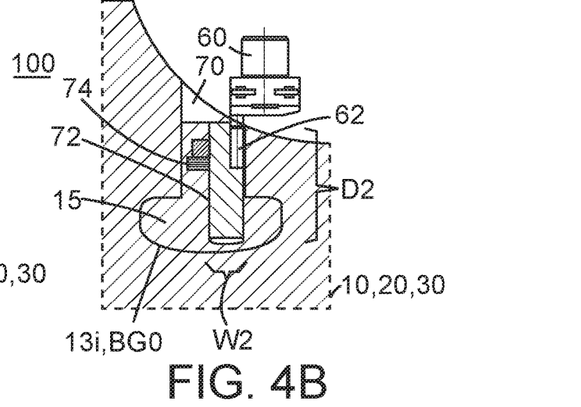
FIG. 4B is a cross-sectional view of a portion of a steam turbine rotor depicting initial steps in the formation of the blade groove BG0 for the acquisition of samples, according to an embodiment.
Figure 5:
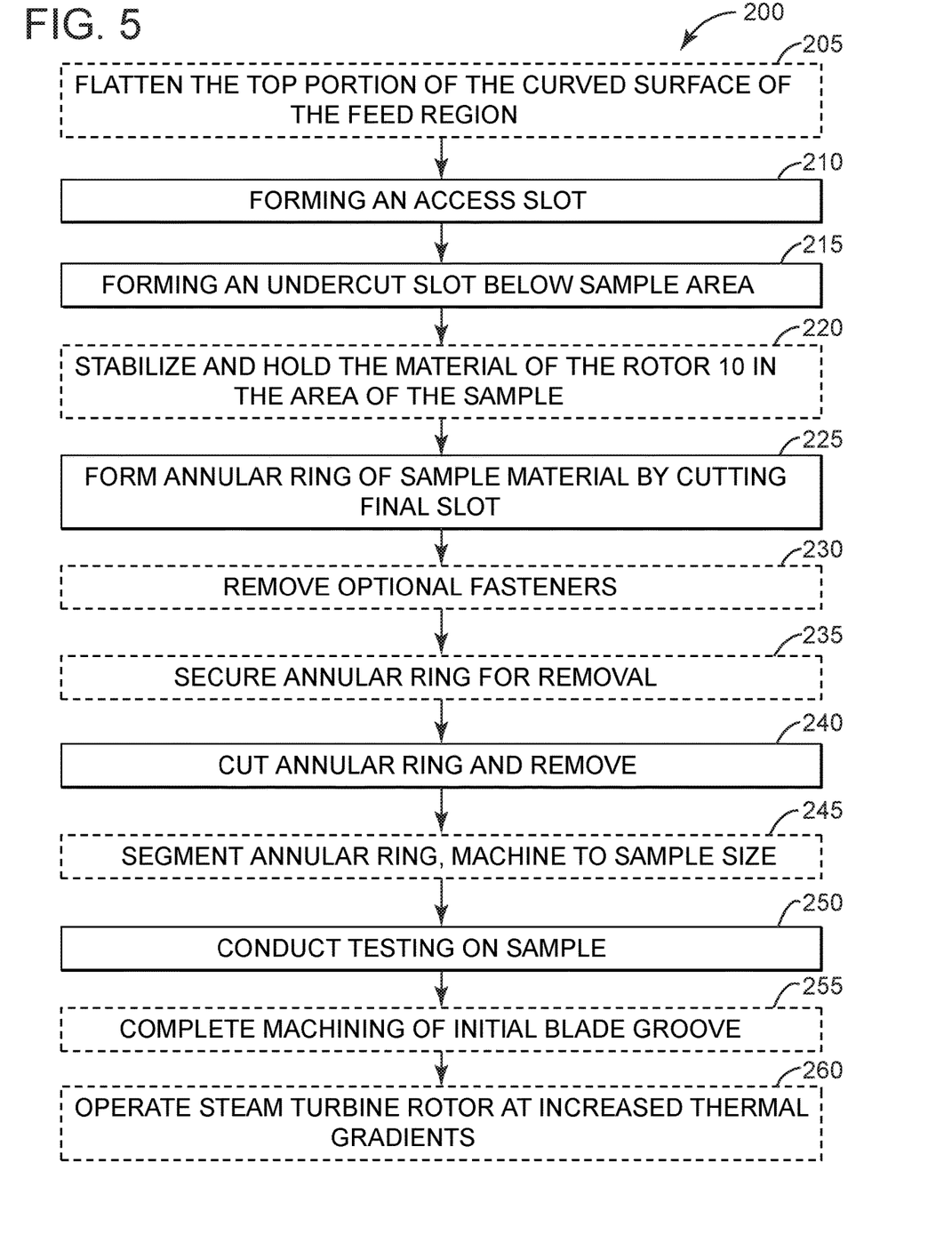
FIG. 5 is a block diagram illustration of a process flow chart describing acquisition of samples in accordance with an embodiment.

Turning now to FIG. 4B, in a first step of the process 205, a lathe 60 and cutter blade 62 are employed to optionally remove a first slot 70 and flatten the top portion of the curved surface of the inlet region rotor surface 14 to initiate formation of the initial blade groove BG0, 13*i*. At process step 210, the lathe 60 and a cutter blade 62, which may be of a different profile than that of the cutter blade 62 employed in step 205, are utilized to remove an access slot 72 (cross-hatched downward left to right), which is cut to a width W2 and depth D2 sufficient to enable clearance for removal of the material to form an undercut slot 74 (cross-hatched horizontally), as described herein. It should be appreciated that the width W2 is configured to provide the necessary clearance without being so wide as to go farther upstream (left as depicted) to remove any material from the area of the sample 50, nor to go any farther downstream (right as depicted) to remove material beyond the depicted outline for the initial blade slot 13*i*. With continued reference to FIG. 4B, at process step 215, the lathe 60 and a right-angle cutting blade 62 are employed to cut under the area of the sample 50, thereby forming the undercut slot 74 as depicted.

Figure 4C:
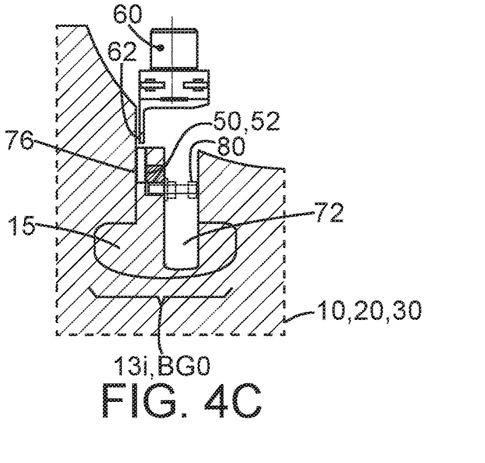
FIG. 4C is a cross-sectional view of a portion of a steam turbine rotor depicting additional steps in the formation of the blade groove BG0 for the acquisition of samples, according to an embodiment.

Turning now to FIG. 4C, the method 200 continues at optional process step 220 in which a plurality of fasteners 80 is installed in the undercut slot 74 as needed to stabilize and hold the material of the rotor 10 in the area of the sample 50 to prepare for the subsequent removal step. In the next step 225 of the process 200, a lathe 60 and cutter blade 62 may be used to remove a final slot 76 (vertically cross-hatched) axially spaced from the access slot 72. The final slot 76 extends radially inward toward the undercut slot 74, and the cutting of the final slot 76 results in the formation of an annular ring 52 (including the sample 50) with a rectangular cross-section disposed about the circumference of the rotor 10. The optional fasteners 80 are removed at process step 230, if needed, freeing the annular ring 52 of removed material for the formation of one or more samples 50, as depicted.

Figure 4D:
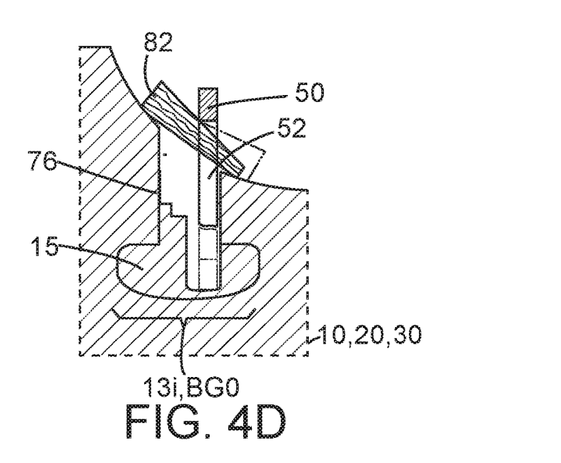
FIG. 4D is a cross-sectional view of a portion of a steam turbine rotor depicting the removal of an annular ring of material from the blade groove BG0 for the preparation of samples, according to an embodiment.

Turning now to FIG. 4D, as depicted at optional process step 235, a wedge 82 may be employed to secure the annular ring 52 for removal from the rotor 10 and initial blade groove BG0, 13*i*. Continuing with the method 200, at process step 240, the annular ring 52 is cut across its cross section at at least two places, yielding a plurality of arcuate sections or segments 54 with rectangular cross section, from which a plurality of samples 50 may be acquired.

Figure 4E:
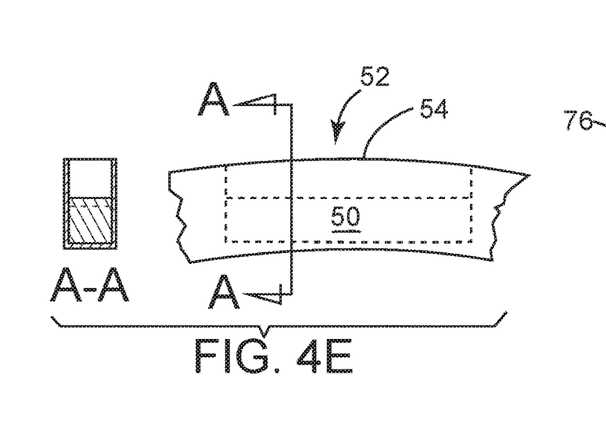
FIG. 4E is a cross-sectional view of a portion of an arcuate segment of the annular ring of FIG. 4D and a testing sample acquired from the annular ring removed from the steam turbine rotor, according to an embodiment.

Turning now to FIG. 4E, an example arcuate segment 54 of the annular ring 52 is depicted. At process step 245, the arcuate segments 54 may readily be cut and machined to size, as needed, to form the standardized samples 50 for impact testing. The resulting shape of the machined samples 50 may be rectangular or round (i.e., circular). It should also be appreciated that other investigations employing samples (such as micro-sections) may be conducted to investigate microstructure of the material, assess hardness, determine tensile strength, and the like. In an embodiment, a plurality of samples 50 is formed, each with the dimensions described previously herein, although other dimensions are possible. The samples 50 may then be employed to conduct impact and Charpy testing as depicted at process step 250 to facilitate evaluation of the FATT for the legacy rotor 10.

Figure 4F:
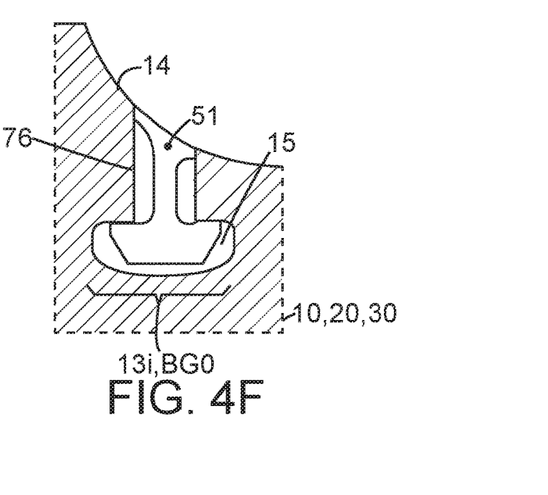
FIG. 4F is a cross-sectional view of a portion of a steam turbine rotor depicting the blade groove BG0 with a filler to facilitate turbine operation, according to an embodiment.

Finally turning to FIG. 4F, and as depicted at process step 255 of FIG. 5, the machining of profile of the initial blade slot BG0, 13*i* may be completed via machining techniques similar to that described herein. A filler material 51 having a shape complementary to the blade slot BG0, 13*i* may be installed into the blade slot BG0, 13*i* to facilitate operation of the steam turbine. The radially outer surface of the filler material 51 may be flush with the inlet region rotor surface 14 to ensure that steam flowing into the inlet region is not disturbed by the blade slot BG0.

In an embodiment, the initial blade slot BG0, 13i is formed to provide thermal and dynamic stress relief for the rotor 10. Providing such thermal stress relief via the initial blade slot BG0, 13i enables a legacy rotor 10 to be employed with larger temperature gradients than previously permitted. As a result, steam turbine warm-up time, start-up time, and start-up frequency are also improved. As depicted at process step 260, the steam turbine may be operated with higher thermal stress (such as greater thermal gradients), when compared to legacy rotors without the initial blade slot BG0, 13i. For example, for a given rotor 10 and steam turbine with a specified thermal gradient limit, employing a new initial blade slot BG0, 13i permits the specified thermal gradient limit to be increased by a factor of about 1.6. Performance improvements for thermal gradients are dependent on the load regime and the future life of the steam turbine rotor 10. The thermal-mechanical damage per typical start-up will be decreased by a factor of up to 300% for a high-pressure turbine rotor 10 and by about 200% for a dual-flow IP turbine rotor.

It should be appreciated that while various steps of the method 200 are depicted in a particular order, they need not be performed strictly in that order and are described in such order merely for the purposes of illustrating the examples of the embodiments. Some steps may readily be conducted in a different order. It should also be appreciated that one or more of the process steps of the method 200 may be automated and controlled. For example with the machining for removal of material of the rotor and processing being automated by a controller or control unit.

In addition to operational savings, the sampling system and method of the described embodiments provides for improved testing and operation capability by evaluating steam turbine life expectancy and enabling longer term operation. In particular, with the present system and method disclosed herein, it is possible to design/plan equipment for conducting the fatigue testing and automation of an assessment of the FATT based at least in part on the results of the fatigue testing. Furthermore, the steam turbine rotor of the described embodiments provides for capital and recurring cost savings on existing retrofitted plant or boiler designs and constructions. In particular, with the system and methodology disclosed herein, it is possible to modify existing equipment for fewer restart constraints while achieving faster and more frequent turbine restarts. Finally, while a particular method for cutting the slots and forming the annular ring is described in accordance with some embodiments, it should be appreciated that other techniques may be possible. For example, is may be possible to form the annular ring employing a variety of cutting techniques beyond cutting the slots as described herein.

An improved steam turbine rotor includes a legacy steam turbine rotor having an inter-blade region rotor surface and an inlet region rotor surface adjoining the inter-blade region rotor surface and a groove formed in either of the inlet region rotor surface or the inter-blade region rotor surface of the legacy steam turbine rotor. The groove is machined to enable removal of material from the legacy steam turbine rotor to enable at least one of conducting material property tests and operating the improved steam turbine rotor at an expanded thermal stress compared to the legacy steam turbine rotor.

In addition to one or more of the features described above, or as an alternative, further embodiments of the improved steam turbine rotor may include that the groove is machined to a first selected width and a first selected depth in the inlet region rotor surface.

In addition to one or more of the features described above, or as an alternative, further embodiments of the improved steam turbine rotor may include that the groove includes an expanded portion at an end of the groove distal from the inlet region rotor surface or the inter-blade region rotor surface in which the groove is machined.

In addition to one or more of the features described above, or as an alternative, further embodiments of the improved steam turbine rotor may include that the expanded portion of the groove includes at least one of rounded corners or rounded edges.

In addition to one or more of the features described above, or as an alternative, further embodiments of the improved steam turbine rotor may include that the rounded corners and rounded edges exhibit different geometries.

In addition to one or more of the features described above, or as an alternative, further embodiments of the improved steam turbine rotor may include that the expanded portion is substantially at least one of a circle, an oval, and ellipse.

In addition to one or more of the features described above, or as an alternative, further embodiments of the improved steam turbine rotor may include that the expanded portion is at least one of symmetrical and asymmetrical in at least one of an axial direction and a radial direction.

In addition to one or more of the features described above, or as an alternative, further embodiments of the improved steam turbine rotor may include that the inlet region rotor surface defines a steam inlet region, and the groove extends through the inlet region rotor surface to provide for additional stress relief in the improved steam turbine rotor.

In addition to one or more of the features described above, or as an alternative, further embodiments of the improved steam turbine rotor may include that the legacy rotor is configured as at least one of an intermediate pressure steam turbine rotor, a high-pressure steam turbine rotor, and a dual flow rotor.

According to another aspect of the disclosure, a system for retrieving a material test sample for conducting material tests from a legacy steam turbine rotor is provided. The legacy steam turbine rotor has an inter-blade region rotor surface and an inlet region rotor surface adjoining the inter-blade region rotor surface. The material test sample is a portion of an arcuate segment of an annular ring of rotor material removed from the legacy steam turbine rotor. The annular ring is machined from a groove formed in the inlet region rotor surface of the legacy steam turbine rotor. The groove is machined to enable removal of the annular ring and to enable forming of the material test sample.

In addition to one or more of the features described above, or as an alternative, further embodiments of the system may include that the material test sample is one of a plurality of material test samples and that the plurality of material test samples has a standardized size resulting from machining of the arcuate segment.

In addition to one or more of the features described above, or as an alternative, further embodiments of the system may include that the material test sample is one of a plurality of material test samples and that the plurality of material test samples has a standardized size suitable for conducting at least one of Charpy impact tests, microstructure tests, hardness tests, creep tests, low cycle fatigue tests, and tensile tests.

In addition to one or more of the features described above, or as an alternative, further embodiments of the system may include that the material test sample is substantially rectangular, while in another embodiment the material test sample is substantially round.

In addition to one or more of the features described above, or as an alternative, further embodiments of the system may include that the material test sample has a width of 10 mm, a height of 10 mm, and a length of selected from the group consisting of 10 mm, 20 mm, and 50 mm.

A method is provided for generating material samples for conducting material tests of a legacy steam turbine rotor having an inter-blade region rotor surface and an inlet region rotor surface adjoining the inter-blade region rotor surface. The method includes forming an annular ring of rotor material in the legacy steam turbine rotor, removing the annular ring from the legacy steam turbine rotor, and forming a material test sample from an arcuate segment of the annular ring.

In addition to one or more of the features described above, or as an alternative, further embodiments of the method may include forming, in a radial direction, a first slot of a first selected width and first selected depth to remove material from the legacy steam turbine rotor in a portion of the inlet region rotor surface; forming, in an axial direction, a second slot adjoining and perpendicular to the first slot to undercut the annular ring; and forming, in the radial direction, a third slot of a second width and a second depth in a portion of the inlet region rotor surface axially spaced from the first slot, wherein the third slot intersects the second slot to free the annular ring of rotor material.

In addition to one or more of the features described above, or as an alternative, further embodiments of the method may include conducting a material test on the material test sample.

In addition to one or more of the features described above, or as an alternative, further embodiments of the method may include assessing results of the material test to assess the Fracture Appearance Transition Temperature (FATT) for the legacy steam turbine rotor.

In addition to one or more of the features described above, or as an alternative, further embodiments of the method may include predicting an extended life profile for the improved legacy steam turbine rotor based at least in part on the assessed FATT.

In addition to one or more of the features described above, or as an alternative, further embodiments of the method may include, prior to forming the first slot, forming a first cut in a radial direction of a selected width and selected depth to remove material from the legacy steam turbine rotor at the inlet region rotor surface to flatten a curved surface thereof.

In addition to one or more of the features described above, or as an alternative, further embodiments of the method may include forming an initial slot in a radial direction of a selected width and selected depth to remove material from the legacy steam turbine rotor at the inlet region rotor surface to flatten a curved surface thereof.

In addition to one or more of the features described above, or as an alternative, further embodiments of the method may include securing the annular ring with fasteners in the second slot prior to forming the third slot.

In addition to one or more of the features described above, or as an alternative, further embodiments of the method may include securing the annular ring prior to segmenting the annular ring into two or more of the arcuate segments.

Finally, it is also to be understood that the system and any control unit (e.g., for operation of the lathe 60 and cutter blade 62) may include the necessary electronics, software, memory, storage, databases, firmware, logic/state machines, microprocessors, communication links, displays or other visual or audio user interfaces, printing devices, and any other input/output interfaces to perform the functions described herein and/or to achieve the results described herein. For example, as previously mentioned, the system may include at least one processor and system memory/data storage structures, which may include random access memory (RAM) and read-only memory (ROM). The at least one processor of the system may include one or more conventional microprocessors and one or more supplementary co-processors, such as math co-processors or the like. The data storage structures discussed herein may include an appropriate combination of magnetic, optical and/or semiconductor memory and may include, for example, RAM, ROM, flash drive, an optical disc (such as a compact disc), and/or a hard disk or drive.

Additionally, a software application that adapts the controller to perform the methods disclosed herein may be read into a main memory of the at least one processor from a computer-readable medium. Thus, embodiments of the present system may perform the methods disclosed herein in real-time. The term "computer-readable medium," as used herein, refers to any medium that provides or participates in providing instructions to the at least one processor of the system (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory (DRAM), which typically constitutes the main memory. Common forms of computer-readable media include, for example, a floppy disk, a flexible disk, hard disk, solid state drive (SSD), magnetic tape, any other magnetic medium, a CD-ROM, DVD, any other optical medium, a RAM, a PROM, an EPROM or EEPROM (electronically erasable programmable read-only memory), a FLASH-EEPROM, any other memory chip or cartridge, or any other medium from which a computer can read.

While in embodiments, the execution of sequences of instructions in the software application causes at least one processor to perform the methods/processes described herein, hard-wired circuitry may be used in place of, or in combination with, software instructions for implementation of the described methods/processes. Therefore, embodiments as described herein are not limited to any specific combination of hardware and/or software.

As used herein, an element or step recited in the singular and proceeded with the word "a" or "an" should be understood as not excluding plural of said elements or steps, unless such exclusion is explicitly stated. Furthermore, references to "one embodiment" of the described embodiments are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Additionally, while the dimensions and types of materials described herein are intended to define the parameters associated with the described embodiments, they should be understood as exemplary embodiments and, as such, are by no means limiting. Many other embodiments may be apparent to those of skill in the art upon reviewing the above description. The scope of the disclosure should, therefore, be determined with reference to the appended claims. Such description may include other examples that occur to one of ordinary skill in the art, and such other examples are intended to be within the scope of the claims if they have structural elements that do not differ from the literal language of the claims, or if they include equivalent structural elements with insubstantial differences from the literal language of the claim.

In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels and are not intended to impose numerical or positional requirements on their objects. Further, the limitations of the following claims that are not written in means-plus-function format are not intended to be interpreted as such, unless and until such claim limitations expressly use the phrase "means for" followed by a statement of function void of further structure.

The invention claimed is:

1. A method for generating a material test sample for conducting one or more material tests of a legacy steam turbine rotor having an inter-blade region rotor surface and an inlet region rotor surface adjoining the inter-blade region rotor surface that includes a radial-to-axial transition surface extending to a first blade groove in the inter-blade region rotor surface to feed steam into the inter-blade region rotor surface, the method comprising:
   removing an annular ring of rotor material in a sample area selected from the inter-blade region rotor surface and the radial-to-axial transition surface of the inlet region rotor surface that feeds steam into the inter-blade region rotor surface, the removing of the annular ring creating an improved legacy steam turbine rotor;
   segmenting the annular ring of rotor material;
   removing the segmented annular ring from the rotor; and
   forming a material test sample from a portion of the segmented annular ring, wherein forming the material test sample includes machining the portion of the segmented annular ring to create a plurality of material test samples.

2. The method of claim 1, further comprising conducting the one or more material tests on one or more of the plurality of material test samples.

3. The method of claim 1, further comprising securing the annular ring prior to the segmenting.

4. The method of claim 1, further comprising, prior to removing the annular ring of rotor material, forming an initial slot in a radial direction of a selected width and selected depth to remove material from the legacy steam turbine rotor at the inlet region rotor surface to flatten a curved surface thereof.

5. The method of claim 1, further comprising assessing results of the one or more material tests to assess the Fracture Appearance Transition Temperature (FATT) for the legacy steam turbine rotor.

6. The method of claim 5, further comprising predicting an extended life profile for the improved legacy steam turbine rotor based at least in part on the FATT.

7. The method of claim 1, wherein removing the annular ring comprises:
   forming, in a radial direction, a first slot of a first selected width and a first selected depth to remove material from the legacy steam turbine rotor, wherein the first slot is formed in a first portion of the inlet region rotor surface;
   forming, in an axial direction, a second slot adjoining and perpendicular to the first slot to undercut sample material in the sample area to remove material from the legacy steam turbine rotor; and
   forming, in the radial direction, a third slot of a second selected width and a second selected depth to remove material from the legacy steam turbine rotor in a second portion of the inlet region rotor surface adjacent to the sample area and axially spaced from the first slot, wherein the third slot intersects the second slot to free the annular ring of rotor material in the sample area.

8. The method of claim 7, further comprising securing the sample area with fasteners positioned in the second slot prior to forming the third slot.

9. A system for retrieving a material test sample for conducting one or more material tests retrieved from a legacy steam turbine rotor, the legacy steam turbine rotor having an inter-blade region rotor surface and an inlet region rotor surface adjoining the inter-blade region rotor surface, the system comprising:
   a segmented section of an annular ring of rotor material from the legacy steam turbine rotor, the annular ring machined from a groove formed in the legacy steam turbine rotor, wherein the groove is machined to enable removal of the annular ring and enable forming of the material test sample;
   wherein the segmented section is machined to produce a plurality of the material test samples of a standardized size for conducting the one or more material tests.

10. The system of claim 9, wherein the annular ring is machined by forming the groove in the inlet region rotor surface.

11. The system of claim 9, wherein the one or more material tests include at least one of Charpy impact tests, microstructure tests, hardness tests, creep tests, low cycle fatigue tests, and tensile tests.

12. The system of claim 9, wherein the material test sample is at least one of substantially rectangular and substantially round.

13. The system of claim 9, wherein the material test sample has a width of 10 mm, a height of 10 mm, and a length selected from the group consisting of 10 mm, 20 mm, and 50 mm.

14. A system for retrieving a material test sample from a legacy steam turbine rotor for conducting one or more material tests, the legacy steam turbine rotor having an inter-blade region rotor surface and an inlet region rotor surface adjoining the inter-blade region rotor surface, the system comprising:
   a lathe and a cutter blade to retrieve the material test sample from the legacy steam turbine rotor, wherein the lathe and the cutter blade operate cooperatively to retrieve the material test sample from the legacy steam turbine rotor by performing operations that include:
      introducing an initial blade groove in either the inter-blade region rotor surface or the inlet region rotor surface of the legacy steam turbine rotor;
      forming an annular ring of rotor material within the initial blade groove that includes the material test sample; and
      removing the annular ring including the material test sample from the legacy steam turbine rotor and the initial blade groove.

15. The system of claim 14, wherein the annular ring is machined by forming the initial blade groove in the inlet region rotor surface.

16. The system of claim 14, wherein the material test sample is at least one of substantially rectangular and substantially round.

17. The system of claim 14, wherein the material test sample has a width of 10 mm, a height of 10 mm, and a length selected from the group consisting of 10 mm, 20 mm, and 50 mm.

18. The system of claim 14, wherein the removing of the annular ring includes cutting the annular ring to yield a plurality of segmented sections, each section corresponding to the material test sample of a standardized size for conducting one or more material tests.

19. The system of claim 18, wherein the one or more material tests include at least one of Charpy impact tests, microstructure tests, hardness tests, creep tests, low cycle fatigue tests, and tensile tests.

\* \* \* \* \*